US012567525B2

(12) United States Patent
Eliason et al.

(10) Patent No.: US 12,567,525 B2
(45) Date of Patent: Mar. 3, 2026

(54) LEVERLESS DETACHABLE MAGNETIC HOOK

(71) Applicant: Magnetic Mechanisms L.L.C., Shoreview, MN (US)

(72) Inventors: Jeffery M. Eliason, Shoreview, MN (US); Mitchell Porch, Grand Rapids, MI (US); Joseph Funk, St. Paul, MN (US); Braden J. Eliason, Minneapolis, MN (US); Benjamin J. Larsen, St. Paul, MN (US); David A. Melander, Saint Louis Park, MN (US); Rebecca E. Wereley, Richfield, MN (US)

(73) Assignee: Magnetic Mechanisms L.L.C., Shoreview, MN (US)

( * ) Notice: Subject to any disclaimer, the term of this patent is extended or adjusted under 35 U.S.C. 154(b) by 279 days.

(21) Appl. No.: 18/455,122

(22) Filed: Aug. 24, 2023

(65) Prior Publication Data

US 2024/0071667 A1 Feb. 29, 2024

Related U.S. Application Data

(60) Provisional application No. 63/400,976, filed on Aug. 25, 2022.

(51) Int. Cl.
*H01F 7/02* (2006.01)

(52) U.S. Cl.
CPC .................................. *H01F 7/0205* (2013.01)

(58) Field of Classification Search
CPC ......... H01F 7/0205; H01F 7/04; H01F 7/0252
See application file for complete search history.

(56) References Cited

U.S. PATENT DOCUMENTS 3,014,751 A 12/1961 Smith
3,241,516 A 3/1966 Hopkins
(Continued)

FOREIGN PATENT DOCUMENTS

AU 753496 B2 6/2001
AU 2002325077 B2 3/2003
(Continued)

OTHER PUBLICATIONS

Supplementary European Search Report for Application No. EP 15 85 21 27, dated Aug. 16, 2018, 2 pages.
(Continued)

*Primary Examiner* — Mohamad A Musleh
(74) *Attorney, Agent, or Firm* — Christensen, Fonder, Dardi & Herbert PLLC; John P. Fonder

(57) ABSTRACT

Leverless magnetic hook devices including a body portion, a hook portion, a magnetic-retaining portion, and a magnetic device. The body portion defines a first surface and a second surface opposite the first surface. The hook portion extends from the first surface of the body portion. The magnet-retaining portion is disposed within at least part of the body portion. The magnetic device defines a first surface coupled to the magnetic retaining portion and a second surface opposite the first surface such that at least a portion of the second surface of the magnetic device extends substantially parallel to and is recessed a distance D from the second surface of the body portion. In this way, the magnetic device is configured to magnetically couple the magnetic hook device to a ferromagnetic object.

18 Claims, 4 Drawing Sheets

(56) References Cited

U.S. PATENT DOCUMENTS

| | | | | |
|---|---|---|---|---|
| 3,419,832 | A * | 12/1968 | Baermann | B25H 3/04 248/309.4 |
| 3,539,800 | A | 11/1970 | Doring | |
| 4,200,852 | A | 4/1980 | Aoki | |
| 6,076,790 | A | 6/2000 | Richter | |
| 6,491,271 | B1 * | 12/2002 | Adams | F16B 45/008 248/304 |
| 6,564,678 | B1 | 5/2003 | Wang | |
| 6,653,920 | B1 | 11/2003 | Chen | |
| 7,012,495 | B2 | 3/2006 | Underwood et al. | |
| 7,172,079 | B1 | 2/2007 | Shiao | |
| 7,207,091 | B2 | 4/2007 | Dunaye | |
| 7,746,205 | B2 | 6/2010 | Fullerton et al. | |
| 7,750,774 | B2 | 7/2010 | Fullerton et al. | |
| 7,750,777 | B2 | 7/2010 | Fullerton et al. | |
| 7,750,778 | B2 | 7/2010 | Fullerton et al. | |
| 7,750,780 | B2 | 7/2010 | Fullerton et al. | |
| 7,750,781 | B2 | 7/2010 | Fullerton et al. | |
| 7,755,462 | B2 | 7/2010 | Fullerton et al. | |
| 7,772,952 | B2 | 8/2010 | Fullerton et al. | |
| 7,800,471 | B2 | 9/2010 | Fullerton et al. | |
| 7,800,472 | B2 | 9/2010 | Fullerton et al. | |
| 7,800,473 | B2 | 9/2010 | Fullerton et al. | |
| 7,808,348 | B2 | 10/2010 | Fullerton et al. | |
| 7,808,349 | B2 | 10/2010 | Fullerton et al. | |
| 7,808,350 | B2 | 10/2010 | Fullerton et al. | |
| 7,834,728 | B2 | 11/2010 | Fullerton et al. | |
| 7,834,729 | B2 | 11/2010 | Fullerton et al. | |
| 7,839,247 | B2 | 11/2010 | Fullerton et al. | |
| 7,839,248 | B2 | 11/2010 | Fullerton et al. | |
| 7,843,294 | B2 | 11/2010 | Fullerton et al. | |
| 7,855,624 | B2 | 12/2010 | Fullerton et al. | |
| 7,868,721 | B2 | 1/2011 | Fullerton et al. | |
| 7,889,038 | B2 | 2/2011 | Fullerton et al. | |
| 7,982,568 | B2 | 7/2011 | Fullerton et al. | |
| 8,035,260 | B2 | 10/2011 | Fullerton et al. | |
| 8,098,122 | B2 | 1/2012 | Fullerton et al. | |
| 8,115,581 | B2 | 2/2012 | Fullerton et al. | |
| 8,174,347 | B2 | 5/2012 | Fullerton et al. | |
| 8,179,219 | B2 | 5/2012 | Fullerton et al. | |
| 8,279,031 | B2 | 10/2012 | Fullerton et al. | |
| 8,279,032 | B1 | 10/2012 | Fullerton et al. | |
| 8,314,671 | B2 | 11/2012 | Fullerton et al. | |
| 8,314,672 | B2 | 11/2012 | Fullerton et al. | |
| 8,350,663 | B1 | 1/2013 | Michael | |
| 8,354,909 | B2 | 1/2013 | Fullerton et al. | |
| 8,356,400 | B2 | 1/2013 | Fullerton et al. | |
| 8,368,495 | B2 | 2/2013 | Fullerton et al. | |
| 8,373,527 | B2 | 2/2013 | Fullerton et al. | |
| 8,461,952 | B1 | 6/2013 | Fullerton et al. | |
| 8,502,630 | B2 | 8/2013 | Richards et al. | |
| 8,570,129 | B2 | 10/2013 | Fullerton et al. | |
| 8,570,130 | B1 | 10/2013 | Fullerton et al. | |
| 8,576,036 | B2 | 11/2013 | Fullerton et al. | |
| 8,593,242 | B2 | 11/2013 | Fullerton et al. | |
| 8,643,454 | B2 | 2/2014 | Fullerton et al. | |
| 8,648,681 | B2 | 2/2014 | Roberts et al. | |
| 8,692,637 | B2 | 4/2014 | Richards et al. | |
| 8,698,583 | B2 | 4/2014 | Fullerton et al. | |
| 8,702,437 | B2 | 4/2014 | Fullerton et al. | |
| 8,704,626 | B2 | 4/2014 | Fullerton et al. | |
| 8,717,131 | B2 | 5/2014 | Fullerton et al. | |
| 8,760,250 | B2 | 6/2014 | Fullerton et al. | |
| 8,760,251 | B2 | 6/2014 | Roberts et al. | |
| 8,760,252 | B2 | 6/2014 | Fullerton et al. | |
| 8,779,877 | B2 | 7/2014 | Fullerton et al. | |
| 8,779,879 | B2 | 7/2014 | Roberts et al. | |
| 8,810,348 | B2 | 8/2014 | Fullerton et al. | |
| 8,816,805 | B2 | 8/2014 | Fullerton et al. | |
| 8,841,981 | B2 | 9/2014 | Fullerton et al. | |
| 8,844,121 | B2 | 9/2014 | Fullerton et al. | |
| 8,848,973 | B2 | 9/2014 | Fullerton et al. | |
| 8,857,044 | B2 | 10/2014 | Fullerton et al. | |
| 8,872,608 | B2 | 10/2014 | Fullerton et al. | |
| 8,878,639 | B2 | 11/2014 | Kocijan | |
| 8,917,154 | B2 | 12/2014 | Fullerton et al. | |
| 8,937,521 | B2 | 1/2015 | Fullerton et al. | |
| 8,947,185 | B2 | 2/2015 | Fullerton et al. | |
| 8,957,751 | B2 | 2/2015 | Fullerton et al. | |
| 8,963,380 | B2 | 2/2015 | Fullerton et al. | |
| 8,963,668 | B2 | 2/2015 | Fullerton et al. | |
| 9,082,539 | B2 | 7/2015 | Fullerton | |
| 9,093,207 | B2 | 7/2015 | Fullerton et al. | |
| 9,105,380 | B2 | 8/2015 | Roberts et al. | |
| 9,105,384 | B2 | 8/2015 | Fullerton et al. | |
| 9,111,672 | B2 | 8/2015 | Fullerton et al. | |
| 9,111,673 | B2 | 8/2015 | Fullerton et al. | |
| 9,202,615 | B2 | 12/2015 | Fullerton et al. | |
| 9,202,616 | B2 | 12/2015 | Fullerton et al. | |
| 9,219,403 | B2 | 12/2015 | Evans | |
| 9,245,677 | B2 | 1/2016 | Fullerton et al. | |
| 9,257,219 | B2 | 2/2016 | Fullerton et al. | |
| 9,269,482 | B2 | 2/2016 | Fullerton | |
| 9,275,783 | B2 | 3/2016 | Fullerton et al. | |
| 9,277,813 | B2 | 3/2016 | Nelson | |
| 9,298,281 | B2 | 3/2016 | Fullerton et al. | |
| 9,312,634 | B2 | 4/2016 | Fullerton et al. | |
| 9,365,049 | B2 | 6/2016 | Fullerton | |
| 9,367,783 | B2 | 6/2016 | Fullerton et al. | |
| 9,371,923 | B2 | 6/2016 | Fullerton et al. | |
| 9,404,776 | B2 | 8/2016 | Fullerton et al. | |
| 9,406,424 | B2 | 8/2016 | Fullerton et al. | |
| 9,412,506 | B2 | 8/2016 | Fullerton et al. | |
| 9,536,650 | B2 | 1/2017 | Fullerton | |
| 9,588,599 | B2 | 3/2017 | Fullerton et al. | |
| 9,689,527 | B2 | 6/2017 | Franklin | |
| 9,711,268 | B2 | 7/2017 | Fullerton et al. | |
| 9,920,783 | B2 | 3/2018 | Runge et al. | |
| 10,008,817 | B2 | 6/2018 | Fullerton et al. | |
| 10,173,292 | B2 | 1/2019 | Fullerton et al. | |
| 10,194,246 | B2 | 1/2019 | Morgan et al. | |
| 10,204,727 | B2 | 2/2019 | Fullerton et al. | |
| 10,736,273 | B1 * | 8/2020 | Kacines | F16M 13/022 |
| 10,903,030 | B2 | 1/2021 | Morton et al. | |
| 10,906,606 | B2 | 2/2021 | Ball et al. | |
| 11,097,401 | B2 | 8/2021 | Morton et al. | |
| D930,354 | S | 9/2021 | Morton et al. | |
| 11,482,359 | B2 | 10/2022 | Eliason et al. | |
| 11,915,862 | B2 | 2/2024 | Eliason et al. | |
| 2004/0239460 | A1 | 12/2004 | Kocijan | |
| 2005/0156085 | A1 | 7/2005 | Radovan | |
| 2005/0216125 | A1 | 9/2005 | Hutson et al. | |
| 2007/0041777 | A1 | 2/2007 | Dietz | |
| 2007/0107665 | A1 | 5/2007 | Enoch | |
| 2007/0194187 | A1 | 8/2007 | Amron | |
| 2009/0211533 | A1 | 8/2009 | Sprung | |
| 2011/0056437 | A1 * | 3/2011 | Sprung | A01K 63/006 119/51.04 |
| 2013/0002382 | A1 | 1/2013 | Zhang | |
| 2013/0222091 | A1 * | 8/2013 | Fullerton | H01F 7/0257 335/295 |
| 2013/0320686 | A1 | 12/2013 | Morton | |
| 2015/0357105 | A1 | 12/2015 | Taylor | |
| 2016/0289046 | A1 | 10/2016 | Norton et al. | |
| 2017/0053725 | A1 | 2/2017 | St. Onge | |
| 2018/0032104 | A1 | 2/2018 | Schatz et al. | |
| 2020/0081483 | A1 | 3/2020 | Laurent et al. | |
| 2020/0148303 | A1 | 5/2020 | Ball et al. | |
| 2020/0169126 | A1 | 5/2020 | Morton et al. | |
| 2021/0154881 | A1 | 5/2021 | Klein et al. | |
| 2021/0180642 | A1 | 6/2021 | Botkus et al. | |
| 2021/0265089 | A1 | 8/2021 | Eliason et al. | |
| 2021/0268615 | A1 | 9/2021 | Morton et al. | |
| 2021/0323634 | A1 | 10/2021 | Ball et al. | |
| 2022/0003355 | A1 | 1/2022 | Hsu | |
| 2022/0045594 | A1 | 2/2022 | Morton et al. | |
| 2022/0072698 | A1 | 3/2022 | Morton et al. | |
| 2022/0415552 | A1 | 12/2022 | Eliason et al. | |

(56) References Cited

U.S. PATENT DOCUMENTS

| | | | |
|---|---|---|---|
| 2024/0071668 A1 | 2/2024 | Eliason et al. |
| 2024/0071669 A1 | 2/2024 | Eliason et al. |

FOREIGN PATENT DOCUMENTS

| | | | |
|---|---|---|---|
| AU | 2002325077 A1 | 6/2003 |
| AU | 2006294433 A1 | 3/2007 |
| AU | 2007224996 B2 | 9/2007 |
| CN | 102217026 | 10/2011 |
| CN | 102369582 | 3/2012 |
| CN | 102804291 | 11/2012 |
| CN | 104287594 A | 1/2015 |
| CN | 106055042 A | 10/2016 |
| CN | 110901793 | 3/2020 |
| DE | 10 2004 015 873 A1 | 10/2005 |
| DE | 10 2010 003 952 A1 | 10/2011 |
| DE | 20 2011 101 534 U1 | 11/2011 |
| DE | 10 2012 223 976 A1 | 6/2014 |
| DE | 20 2016 006 696 U1 | 1/2017 |
| DE | 10 2016 225 750 A1 | 6/2018 |
| DE | 10 2016 225 893 A1 | 6/2018 |
| EP | 1 425 763 B1 | 2/2017 |
| EP | 2 438 601 B1 | 3/2017 |
| EP | 3 166 749 B1 | 8/2021 |
| EP | 3746261 A4 | 11/2021 |
| GB | 444786 A | 3/1936 |
| JP | S61187525 U | 11/1986 |
| JP | H09 92525 A | 4/1997 |
| JP | 2003-052574 A | 2/2003 |
| JP | 2006-321149 A | 11/2006 |
| JP | 5559770 | 9/2011 |
| JP | 2012-513997 | 6/2012 |
| JP | 2012-530950 | 12/2012 |
| JP | 5604715 | 10/2015 |
| JP | 2018-510790 | 4/2018 |
| KR | 10-2004-0065521 A | 7/2004 |
| KR | 10-0839166 B1 | 6/2008 |
| KR | 10-2008-0094328 | 10/2008 |
| KR | 10-863560 B1 | 10/2008 |
| KR | 10-2008-0098705 | 11/2008 |
| KR | 10-1919096 B1 | 11/2008 |
| KR | 10-1243599 B1 | 3/2013 |
| KR | 10-1460840 B1 | 11/2014 |
| KR | 10-2015-0005071 | 1/2015 |
| KR | 10-2015-0053576 | 5/2015 |
| KR | 10-1672986 B1 | 11/2016 |
| KR | 10-1715922 B1 | 3/2017 |
| KR | 10-2017-0096643 | 8/2017 |
| KR | 10-2017-0126532 | 11/2017 |
| KR | 10-2018-0037615 | 4/2018 |
| KR | 10-1847297 B1 | 5/2018 |
| KR | 10-2018-0060185 | 6/2018 |
| KR | 10-2020-0017717 | 2/2020 |
| KR | 10-2020-0095707 A | 8/2020 |
| KR | 10-2200860 B1 | 1/2021 |
| KR | 10-2200861 B1 | 1/2021 |
| WO | WO 2005/012757 A1 | 2/2005 |
| WO | WO 2009/000008 A1 | 12/2008 |
| WO | WO 2009/000599 A1 | 12/2008 |
| WO | WO 2009/140750 A2 | 11/2009 |
| WO | WO 2010/020006 A1 | 2/2010 |
| WO | WO 2010/135788 A1 | 12/2010 |
| WO | WO 2018/008993 A1 | 1/2018 |
| WO | WO 2018/227140 A1 | 12/2018 |
| WO | WO 2019/165228 A1 | 8/2019 |

OTHER PUBLICATIONS

Notification of Transmittal of the International Search Report and the Written Opinion of the International Searching Authority, or the Declaration for Application No. PCT/US2021/018587, dated Aug. 6, 2021, (21 pages).

Notification of Transmittal of the International Search Report and the Written Opinion of the International Searching Authority, or the Declaration for Application No. PCT/US2023/030934, dated Oct. 16, 2023, (6 pages).

Notification of Transmittal of the International Search Report and the Written Opinion of the International Searching Authority, or the Declaration for Application No. PCT/US2023/031051, dated Nov. 15, 2023, (8 pages).

Notification of Transmittal of the International Search Report and the Written Opinion of the International Searching Authority, or the Declaration for Application No. PCT/US2023/031059, dated Jan. 3, 2024, (10 pages).

Notification of Transmittal of the International Search Report and the Written Opinion of the International Searching Authority, or the Declaration for Application No. PCT/US2023/031049, dated Jan. 8, 2024, (16 pages).

Amazon.com, Site visited Sep. 17, 2025, MAGTSMEI Black Magnetic Hooks Heavy Duty, Date first available, Dec. 14, 2021, https://www.amazon.com/MAGTSMEI-Magnetic-Neodymium-Refrigerator-Industrial/dp/B09NM7B6QG/ref=ast_sto_dp_puis?th=1 (Year: 2021).

Amazon.com, Site visited Sep. 17, 2025, Enuoda Strong Magnetic Hooks Heavy Duty, Date first available, Feb. 26, 2024, https://www.amazon.com/ENUODA-Magnetic-Magnets-Utility-Extension/dp/BOCWGW4JLD?ref_=ast_sto_dp&th=1 (Year: 2024).

Amazon.com, Site visited Sep. 17, 2025, FINDMAG Magnetic Hooks, Date first available, Oct. 17, 2023, https://www.amazon.com/FINDMAG-Magnetic-Neodymium-Hanging-Refrigerator/dp/B0CC8WVB57?ref_=ast_sto_dp&th=1 (Year:2023).

Amazon.com, Site visited Sep. 17, 2025, Magnetic Hooks for Grill & Refrigerator, Date first available, Jul. 10, 2024, https://www.amazon.com/Magnetic-Refrigerator-4-Pack-Rubber-Coated/dp/BOD9644TKP/ref=sr_1_2?dib=eyJ2IjoiMSJ9.qUf5v3fcOsJLDCzHQ13YZxhEhD73EXURaOP7zDE4BYwpZ-NpH97x9W7RBGFWJIB7BfUtTwe4Q3b1JSOqESqBWLbskhxVi8vjMQrMn3kMhdAPB_0bp8dE9otH2pAPw6tDe04oh2FPOfA922B2smN_omcggG18dbKgu7y70Wg7ySE4OBVKVYGXsjRRAnR-5iIcNlydoh7j4OL3F9ufVFdDW4bZ1cF40x8atQJu-3HfLpaf5pTBX3jPjytvr09UhHvI.glqMaaB3VhbuA4qCI6cWr_WyYUiMiDAhCayNtpyd6ws&dib_tag=se&qid=1757689830&refinements=p_89%3AJINGZHAN&sr=8-2&srs=121075627011&th=1 (Year:2024).

* cited by examiner

LEVERLESS DETACHABLE MAGNETIC HOOK

CROSS-REFERENCE TO RELATED APPLICATIONS

This application claims the benefit of U.S. Provisional Patent Application No. 63/400,976, filed Aug. 25, 2022, which is incorporated herein in its entirety.

FIELD OF THE INVENTION

The invention relates generally to leverless detachable magnetic hooks for attaching to a ferromagnetic object and hanging other objects therefrom.

BACKGROUND

This disclosure related generally to devices having one or more magnets which generate magnetic attraction forces with ferromagnetic objects.

SUMMARY

Leverless detachable magnetic hooks for attaching to a ferromagnetic object and hanging other objects therefrom and methods for forming the same are disclosed. In some examples, a magnetic hook device may include a body portion, a hook portion, a magnet-retaining portion, a magnetic device, and a grip material. The body portion may include a top body portion defining a first surface and a bottom body portion defining a second surface opposite the first surface. The top body portion is coupled to the bottom body portion such that the top body portion and the bottom body portion define a cavity. The hook portion may extend from bottom body portion outwardly beyond the first surface of the top body portion. The magnet-retaining portion is disposed within the cavity. The magnetic device defines a first surface coupled to the magnetic retaining portion and a second surface opposite the first surface, such that at least a portion of the second surface of the magnetic device extends substantially parallel to the second surface of the body portion. The grip material is disposed on the second surface of the magnetic device and at least a portion of the second surface of the bottom body portion. In this way, the magnetic device is configured to magnetically couple the magnetic hook device to a ferromagnetic object.

In other examples, a magnetic hook device includes a body portion, a hook portion, a magnetic-retaining portion, and a magnetic device. The body portion defines a first surface and a second surface opposite the first surface. The hook portion extends from the first surface of the body portion. The magnet-retaining portion is disposed within at least part of the body portion. The magnetic device defines a first surface coupled to the magnetic retaining portion and a second surface opposite the first surface such that at least a portion of the second surface of the magnetic device extends substantially parallel to and is recessed a distance D from the second surface of the body portion. In this way, the magnetic device is configured to magnetically couple the magnetic hook device to a ferromagnetic object.

In some examples, a method of forming a magnetic hook device may include forming a body portion that includes a top body portion defining a first surface and a bottom body portion defining a second surface opposite the first surface of the top body portion, such that the top body portion and the bottom body portion define a cavity therebetween. The method also may include forming a hook portion coupled to or integrally formed with at least one of the top body portion or the bottom body portion, where the hook portion extends outwardly from the first surface of the top body portion. The method also may include positioning a magnetic-retaining portion within the cavity. The method also may include coupling a first surface of a magnetic device to the magnetic-retaining portion such that a second surface of the magnetic device opposite the first surface of the magnetic device is disposed substantially parallel to the second surface of the bottom body portion.

BRIEF DESCRIPTION OF THE DRAWINGS

The invention can be understood in consideration of the following detailed description of various embodiments of the invention in connection with the accompanying drawings, in which.

Figure 2:
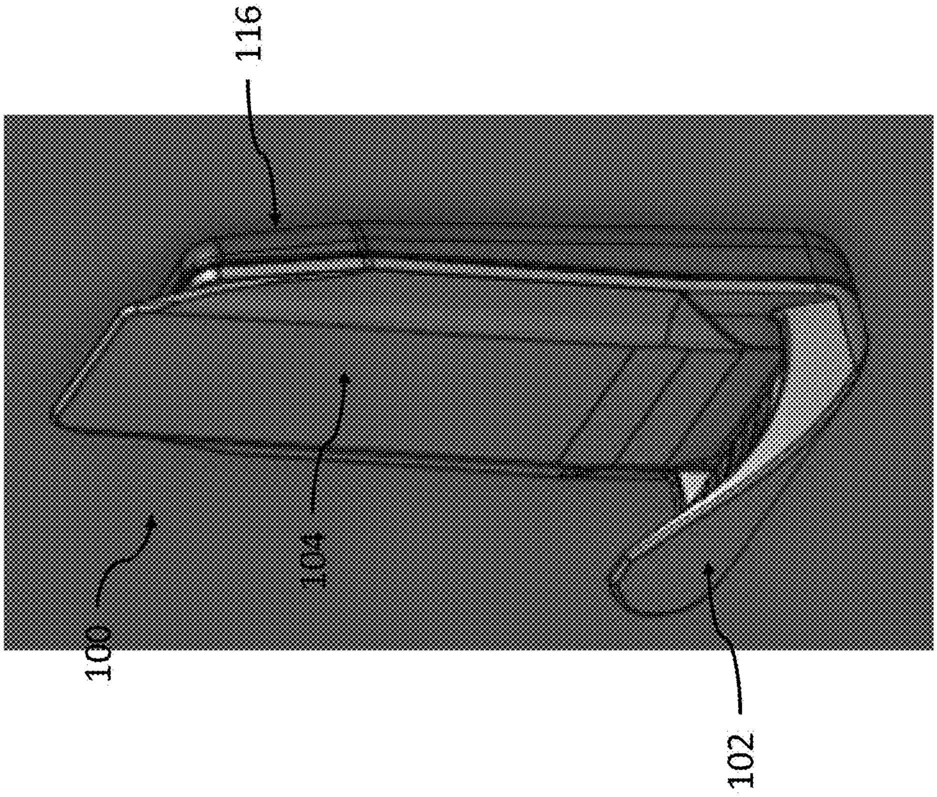
FIG. 2 is a perspective view of the leverless detachable magnetic hook of FIG. 1, according to an embodiment.
Figure 1:
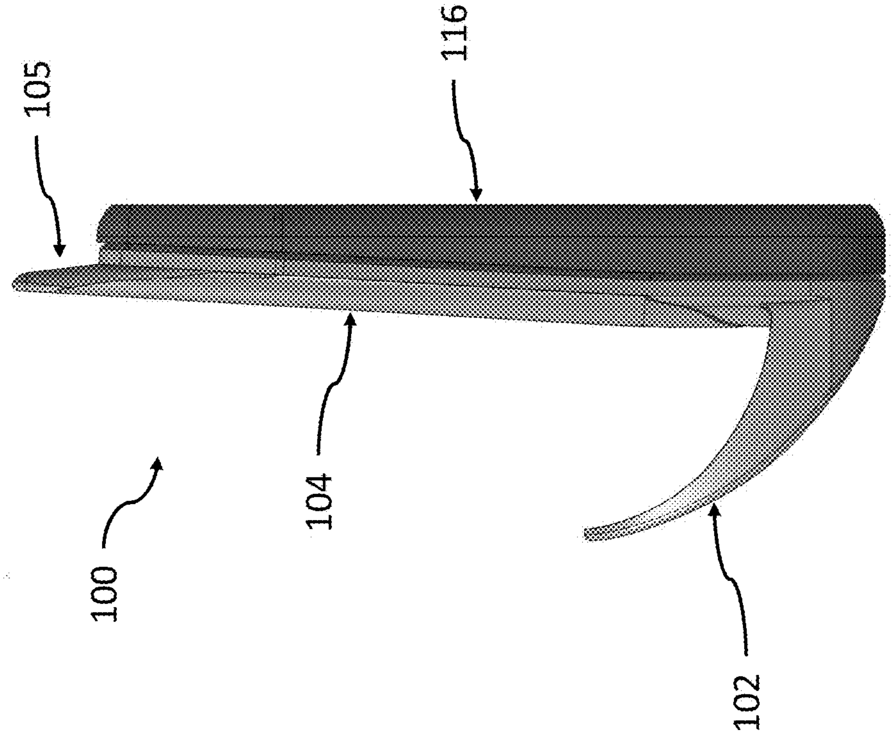
FIG. 1 is a side view of a leverless detachable magnetic hook, according to an embodiment.

The drawings included in the present patent application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Magnets may be used to attach items to ferromagnetic objects, such as, for example, to store the items. The disclosure describes leverless magnetic hooks having a magnetic device that is positioned within the body of the magnetic hook to improve the magnetic force between the magnetic hook and the ferromagnetic object. In some examples, the leverless magnetic hook also may include a grip material configured to prevent the hook from sliding on a vertical plane of the ferromagnetic object and reduce marring the surface of the ferromagnetic object, thereby enhancing the utility of the magnetic hook.

Referring to FIGS. 1-4, an embodiment of a detachable magnetic hook device 100 (hereinafter, hook device 100) is depicted. As described in further detail below, hook device 100 includes a magnetic device 108 which is used to attach hook device 100 to a ferromagnetic surface or object, without allowing magnetic device 108 to touch a surface of the ferromagnetic object, thus maximizing a normal force exerted by magnetic device 108 through hook device 100 onto the ferromagnetic object and allowing hook device 100 to hold significantly heavy items on its hook portion, at the surface of the ferromagnetic object. Further, hook device 100 does not include pivoting or levering components, though hook device 100 is configured to pivot in its entirety at its end via a force applied by a user to the device itself, as will be described further below.

In an embodiment, hook device 100 includes a hook portion 102, body portion 104 including a front body portion 104*a* and a rear body portion 104*b*, a magnet-retaining portion 106, which is understood to be a magnet shunt plate, and a magnetic device 108.

Hook portion 102 extends outwardly and away from body portion 104 forming a hook onto which items may be hung or hooked. Hook portion 102 may comprise one or more relatively rigid or hard materials, such as a plastic material or a metal. Hook portion 102 may be coupled to top body portion 104*a*, bottom body portion 104*b*, or both. For example, hook portion 102 may be coupled to and extend from a surface 113 of top body portion 104*a*. In other examples, hook portion 102 may be coupled to at least a portion of bottom body portion 104*b* and extent toward and beyond surface 113 of top body portion 104*a*. In other examples, at least first part of hook portion 102 may be coupled to bottom body portion 104*b* and at least a second part of hook portion 102 may be coupled to top body portion 104*a*. In some examples, hook portion 102 may be integrally formed with top body portion 104*a* and/or bottom body portion 104*b*.

As illustrated in FIGS. 1-4, hook portion 102 may be curved. In other examples, hook portion 102 may be straight and optionally may include one or more bulbous portions or may be configured to receive and removably secure an item by mechanical coupling, friction fit, or the like.

Top body portion 104*a* and bottom body portion 104*b* may comprise one or more relatively rigid or hard materials, such as a plastic material or a metal. Top body portion 104*a* and bottom body portion 104*b* may be separately formed or integrally formed by any suitable technique, including, but not limited to, molding, casting, forging, stamping, sintering, thermoforming, additive manufacturing, substrative manufacturing, or the like.

In some examples, top body portion 104*a* may be coupled to bottom body portion 104*b* to define a cavity 110 therebetween. When separately formed, top body portion 104*a* may be coupled to bottom body portion 104*b* by any suitable means for joining plastic or metal components, including, but not limited to, adhesive bonding, brazing, compression molding, hot staking, mechanical fastening, press or snap fit, soldering, solvent bonding, and welding (e.g., arc, electron beam, infrared, laser, radio frequency, resistance, thermal, ultrasonic, and vibration).

Magnet-retaining portion 106 is disposed within at least a portion of cavity 110. In examples in which top body portion 104*a* and bottom body portion 104*b* are separately formed, magnetic-retaining portion 106 may be positioned within a portion of cavity 110 defined by either of top body portion 104*a* or bottom body portion 104*b* prior to coupling top body portion 104*a* to bottom body portion 104*b*. In examples in which top body portion 104*a* and bottom body portion 104*b* are integrally formed, top body portion 104*a* and bottom body portion 104*b* may be overmolded onto magnetic-retaining portion.

Bottom body portion 104*b* defines magnet opening 112 into which magnetic device 108 is received. For example, at least a portion of magnetic device 108 extends through magnet opening 112 of bottom body portion 104*b*, e.g., to a rear surface 105*b* of bottom body 104*b*.

Grip material 116 is coupled to a rear side 114 of bottom body portion 104*b* and extends over a rear surface 120 of magnetic device 108. Grip material 116 defines a grip surface 117 configured to engage a surface of a ferromagnetic material, for example, via a frictional force. Grip material 116 may include a relatively high-coefficient-of-friction material. A relatively high-coefficient-of-friction material may include one or more materials having a static coefficient of friction on a clean and dry ferromagnetic object of greater than about 0.1, such as greater than about 0.2 or greater than about 0.3. In some examples, grip material 116 may include, but is not limited to one or more thermoplastic elastomer ("TPE") materials, thermoplastic polyurethane ("TPU") materials, thin silicone tapes, conformal coatings (e.g., Dowsil 1-2577), 3M Grip Tape, rubber sprays and coatings (e.g., PLASTI DIP multipurpose rubber coating available from Plasti Dip International of Blaine, Minnesota), abrasive tapes, and tacky adhesive tapes. Grip material 116 may be coupled to bottom body portion 104*b* by any suitable means, including, but not limited to, adhesive bonding, compression molding, hot staking, mechanical fastening, overmolding, press or snap fit, solvent bonding, and welding (e.g., infrared, laser, radio frequency, thermal, ultrasonic, and vibration).

In some embodiments, the frictional force of coatings tapes may be optimized for each magnet system design to provide a high coefficient of friction with durability at a minimum thickness to maintain the maximum magnetic attachment (normal) forces. For example, grip material 116 may have a tensile strength greater than about 20 megapascal (MPa), such as greater than about 30 MPa, greater than about 40 MPa, or greater than about 50 MPa.

In some examples, a durometer of bottom body portion 104*b* is greater than a durometer of grip material 116.

Magnet-retaining portion 106 may include a ferromagnetic metal material such as, for example, transition metals; iron, nickel, cobalt, alloys thereof; or alloys of rare-earth metals, and in an embodiment is a generally flat plate, though other shapes are contemplated.

Magnetic device 108 in an embodiment, is a magnet assembly, and may include, though not be limited to, any of the magnetic assemblies of devices described in commonly assigned U.S. patent application Ser. No. 17/895,464, the entire contents of which is incorporated herein by reference. Embodiments of magnetic device 108 are generally configured to concentrate magnetic flux close to an outer surface of the magnetic device, and hence an attachment surface, to maximize normal and frictional holding force, as explained further below.

In one such embodiment, magnetic device 108 includes a magnetic sheet and a baseplate. The magnet sheet may define a plurality of island portions (i.e., individual magnetic regions with alternating north and south magnetic poles) and a plurality of interstitial portions, each interstitial portion of the plurality of interstitial portions disposed between two or more respective island portions of the plurality of island portions. The baseplate may include a conductive material. In an embodiment magnetic device 108 also includes a front side with a front surface 121 for connection to magnet-retaining portion 106, and a rear side with rear a surface to be positioned near a ferromagnetic attachment object.

In another embodiment, magnetic device 108 may define a channel magnetic device, i.e., channel magnet. For example, a flux of magnetic device 108 may be manipulated or improved using a shunt or channel plate, such as magnet-retaining portion 106. By adding a channel shunt plate to front surface 121 of magnetic device 108, the available flux projecting from the back of the magnet will conduct through a ferromagnetic material, such as steel, and focus more available flux towards the target ferromagnetic object, thus increasing flux density on the attachment or rear side of the magnetic device 108. Consequently, magnetic device 108, in an embodiment, may comprise a channel magnet.

In another embodiment, magnetic device 108 may include strips of magnetic material alternating with strips of steel spacers. In one such embodiment, magnetic device 108 includes a plurality of 0.125" wide×0.125" high×2" long magnets with 0.0625" wide×0.125" high×2" long steel strips between each pair of the plurality of long, slender magnets.

Figure 3:
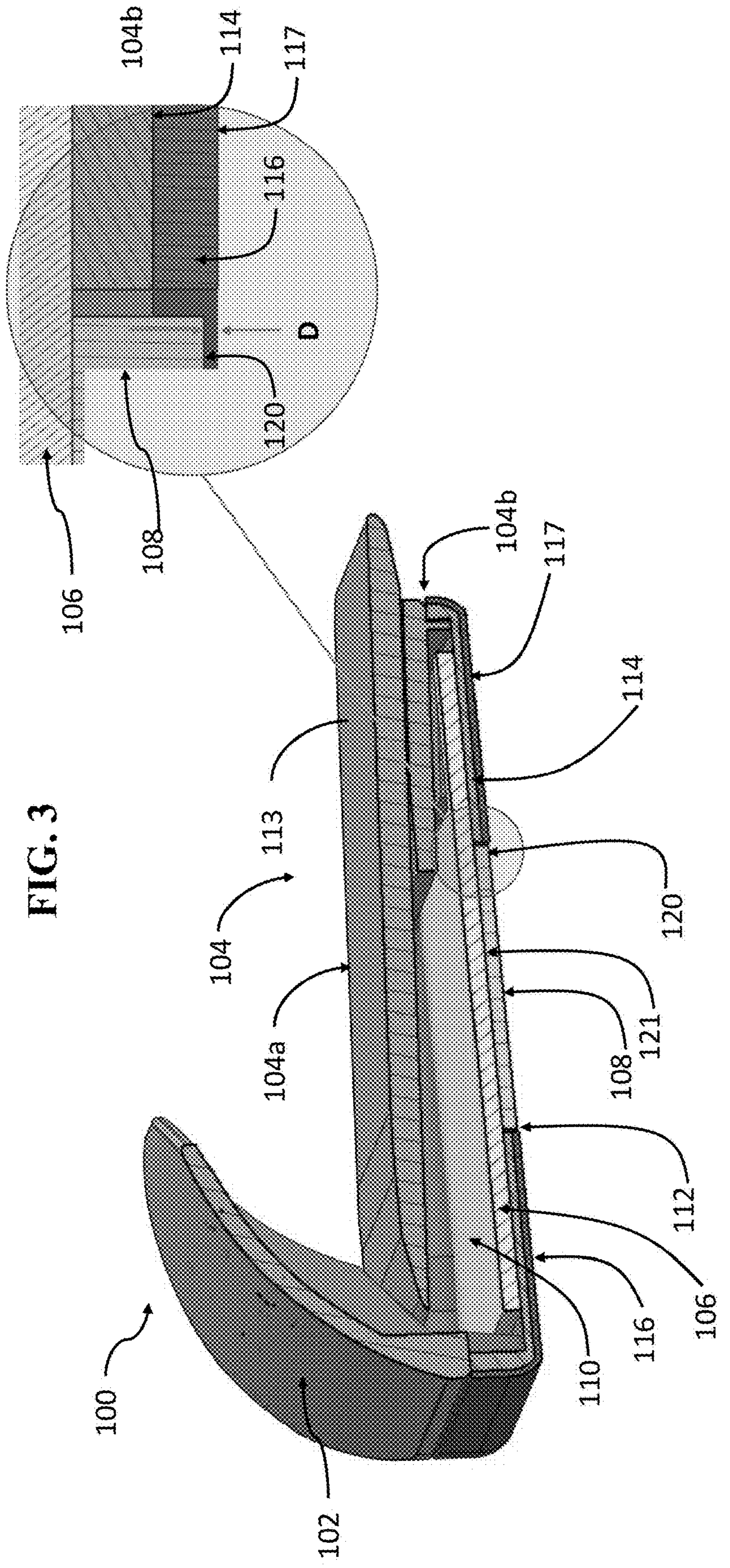
FIG. 3 is a sectional view of the leverless detachable magnetic hook of FIG. 1, according to an embodiment.

Referring specifically to FIG. 3, magnet-retaining portion 106 with attached magnetic device 108 is positioned and secured within body cavity 110, with a portion of magnetic device 108 within magnet opening 112. Rear surface 120 of magnetic device 108 is positioned generally parallel with rear side 114 of bottom body portion 104*b*. Magnetic device 108 is displaced a uniform distance D from a rear-most surface of rear side 117 of grip material 116, which is the surface that contacts the surface of the ferromagnetic object.

Figure 4:
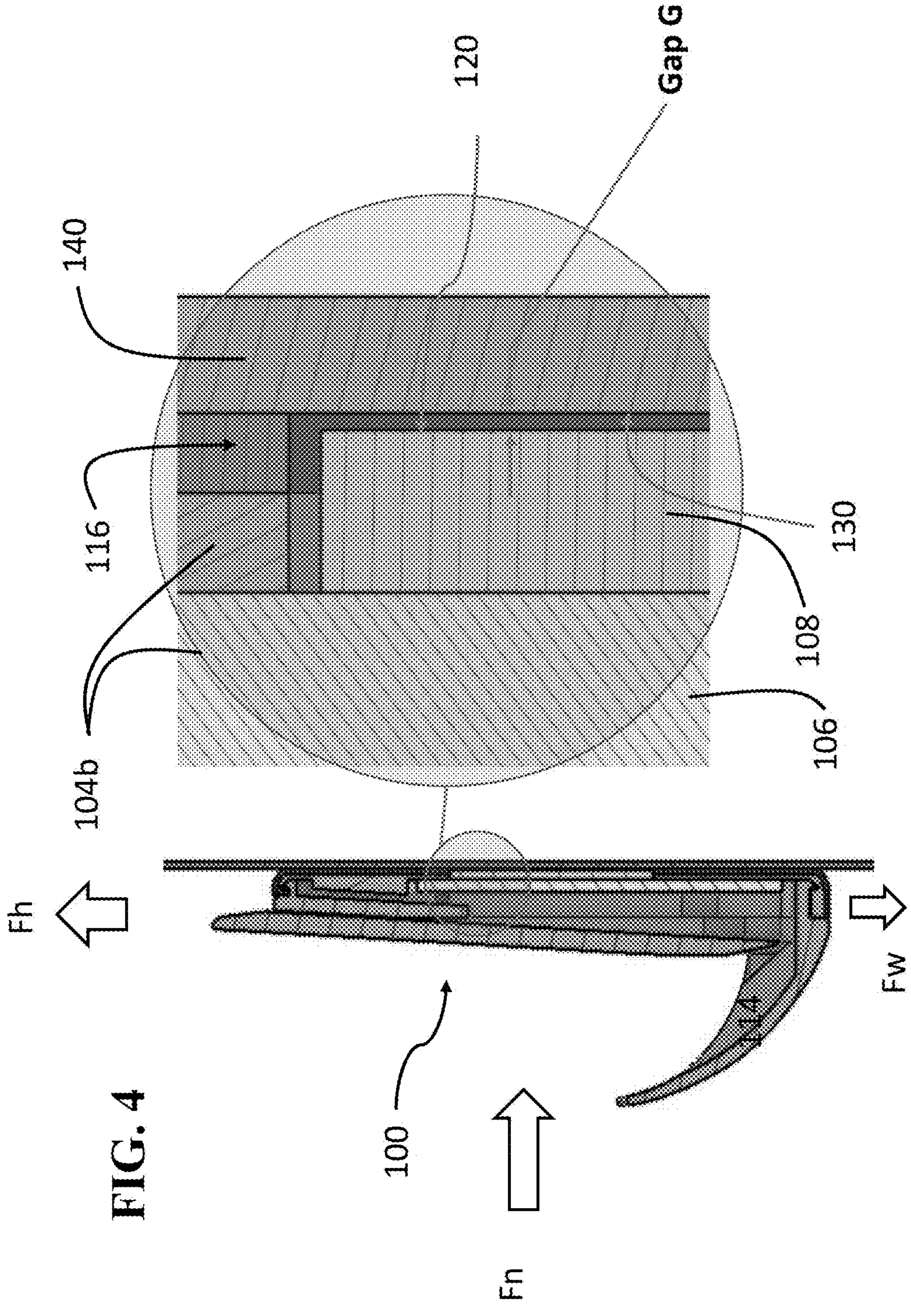
FIG. 4 is another sectional view of the leverless detachable magnetic hook of FIG. 1, according to an embodiment.

As illustrated in the example of FIG. 4, when magnetic hook device 100 is attached to a surface of a ferromagnetic attachment object 140, grip material 116 may be at least partially compressed by the normal force of magnetic device 108. In this may, surface 120 is moved closer to the surface of ferromagnetic object 140, thus decreasing D. Further, when hook device 100 is attached to a surface of a ferromagnetic attachment object 140, the compression of grip material 116 may reduce uniform distance D to a gap G. In other examples, grip material 116 may not substantially compress such that, when hook device 100 is attached to a surface of a ferromagnetic attachment object 140, gap G may be substantially equal to distance D.

Figure 5:
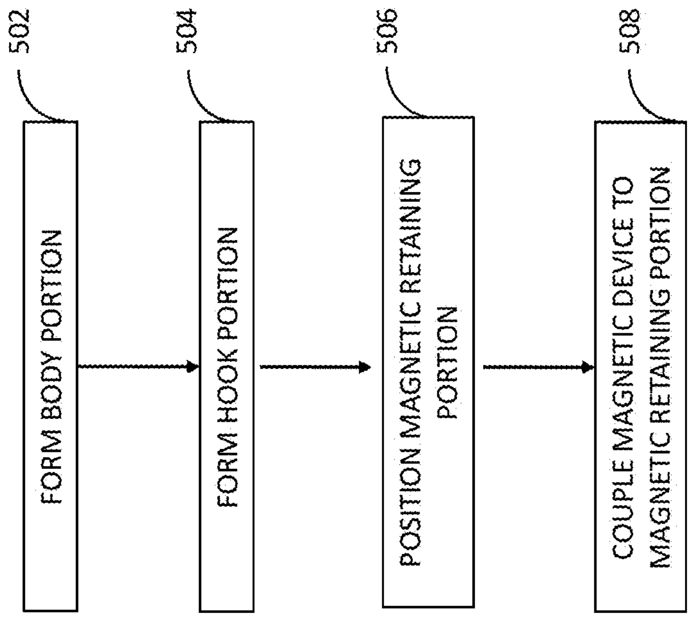
FIG. 5 is a block flow diagram illustrating an example technique of forming a magnetic hook device.

Referring also to FIG. 5, magnetic hook device 100 is depicted as attached to surface 130 of ferromagnetic object 140. Gap G is formed between rear magnet surface 120 and surface 130 of ferromagnetic object 140 (and rear surface 117 of grip material 116). In an embodiment, gap G is relatively small, such as between 0.01 millimeters (mm) and 0.5 mm, so as to maximize normal force Fn and, by not touching surface 130, to distribute all of the normal force through grip material 116, rather than through both relatively-high-coefficient-of-friction grip material 116 and relatively-low-coefficient-of-friction magnetic device 108, to surface 130. This configuration maximizes an upward frictional force or holding force Fh (when hook device 100 is attached to a vertical surface) which is opposite to a downward gravitational force Fw exerted on hook device 100 when an object is hooked on or connected to hook device 100.

To remove magnetic hook device 100 from surface 130 of ferromagnetic object 140, a user may apply a force opposite to the normal force Fn of hook device 100 at a protrusion 103 extending from top body portion 104*a*, substantially parallel to surface 113, thereby levering hook device 100 off ferromagnetic object 140. Protrusion 103 may be shaped to engage a tool for removal of hook device 100, including, for example, one or more fingers, a pliers, a screwdriver, or another tool configured to apply a force to hook device 100 to disengage magnetic device 108 from the ferromagnetic object 140. In some examples, in response to a force applied by a tool to protrusion 103, at least a portion of one or more of top body portion 104*a*, bottom body portion 104*b*, or magnet-retaining portion 106 may be configured to deform or otherwise bend to concentrate at least a portion of the force on at least a portion of magnetic device 108 to facilitate disengagement of magnetic device 108 form ferromagnetic objection 120.

Material of grip portion 116 may extend around the ends of base 104 so that when hook device 100 is pivoted at its ends, soft grip material of grip portion 116 remains in contact with the surface of the ferromagnetic object so as to avoid scratching or marring by base 104.

As discussed above, magnetic hook device 100 and the components thereof may be formed by any suitable technique. FIG. 5 is a block flow diagram illustrating an example technique of forming a magnetic hook device.

In some examples, the technique of forming a magnetic hook device may include forming a body portion 104 (502). As discussed above, body portion 104 includes top body portion 104*a* defining surface 113 and bottom body portion 104*b* defining surface 114 opposite surface 113 of top body portion 104*a*. Forming body portion 104 may include coupling top body portion 104*a* to bottom body portion 104*b* to define cavity 110 therebetween.

The technique illustrated in FIG. 5 also includes forming hook portion 102 (504). For example, as discussed above, hook portion 102, which extends outwardly from surface 105*a* of top body portion 104*a*, may be coupled to or integrally formed with at least one of top body portion 104*a*, bottom body portion 104*b*, or both.

The technique illustrated in FIG. 5 also includes positioning magnetic-retaining portion 106 within cavity 110. For example, top body portion 104*a* may be coupled to bottom body portion 104*b* so as to enclose magnetic-retaining portion 106 within cavity 110, top body portion 104 or bottom body portion 104*b* may be overmolded on at least a portion of magnetic-retaining portion 106, or a combination thereof.

The technique illustrated in FIG. 5 also includes coupling surface 121 of magnetic device 108 to magnetic-retaining portion 106 such that surface 120 of magnetic device 108 opposite surface 121 of magnetic device 108 is disposed substantially parallel to surface 114 of bottom body portion 104*b*.

In some examples, the technique also may include coupling grip material 116 to surface 120 of magnetic device 108 and at least a portion of surface 114 of bottom body portion. As discussed above, grip material 116 defines grip surface 117 opposite surface 114 of bottom body portion 104*b* and surface 120 of magnetic device 108 may be a distance D from grip surface 117, e.g., the distance D may be within a range from about 0.01 millimeters to about 0.5 millimeters.

In some examples, the technique also may include forming magnetic sheet of magnetic device 108 such that the magnetic sheet defines a plurality of magnetic island portions with alternating north and south magnetic poles and a plurality of interstitial portions, each interstitial portion of the plurality of interstitial portions disposed between two or more respective island portions of the plurality of island portions.

All of the features disclosed in this specification, and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The following clauses illustrate the subject matter described herein.

Clause 1. A magnetic hook device, comprising: a body portion comprising a top body portion defining a first surface and a bottom body portion defining a second surface opposite the first surface, wherein the top body portion is coupled to the bottom body portion, wherein the top body portion and the bottom body portion define a cavity; a hook portion extending from bottom body portion outwardly beyond the first surface of the top body portion; a magnet-retaining portion disposed within the cavity; a magnetic device defining a first surface coupled to the magnetic retaining portion and a second surface opposite the first surface, wherein at least a portion of the second surface of the magnetic device extends substantially parallel to the second surface of the body portion; a grip material disposed on the second surface of the magnetic device and at least a portion of the second surface of the bottom body portion, wherein the magnetic device is configured to magnetically couple the magnetic hook device to a ferromagnetic object.

Clause 2. The magnetic hook device of clause 1, wherein the grip material defines a grip surface opposite the second surface of the bottom body portion, wherein the second surface of the magnetic device is a distance D from the grip surface, wherein the distance D is within a range from about 0.01 millimeters to about 0.5 millimeters.

Clause 3. The magnetic hook device of clause 1, wherein the grip material is configured to compress in response to a force between the magnetic device and the ferromagnetic object.

Clause 4. The magnetic hook device of clause 1, wherein the magnetic device comprises magnetic sheet defining a plurality of magnetic island portions with alternating north and south magnetic poles and a plurality of interstitial portions, each interstitial portion of the plurality of interstitial portions disposed between two or more respective island portions of the plurality of island portions.

Clause 5. A magnetic hook device, comprising: a body portion defining a first surface and a second surface opposite the first surface; a hook portion extending from the first surface of the body portion; a magnet-retaining portion disposed within at least part of the body portion; and a magnetic device defining a first surface coupled to the magnetic retaining portion and a second surface opposite the first surface, wherein at least a portion of the second surface of the magnetic device extends substantially parallel to and is recessed a distance D from the second surface of the body portion, wherein the magnetic device is configured to magnetically couple the magnetic hook device to a ferromagnetic object.

Clause 6. The magnetic hook device of clause 5, wherein distance D is within a range from about 0.01 millimeters to about 0.5 millimeters.

Clause 7. The magnetic hook device of clause 5, wherein the second surface of the body portion comprises grip material, wherein the grip material is configured to compress in response to a force between the magnetic device and the ferromagnetic object.

Clause 8. The magnetic hook device of clause 7, wherein the grip material covers at least a portion of the body portion extending between the first surface of the body portion and the second surface of the body portion.

Clause 9. The magnetic hook device of clause 5, wherein the magnetic device comprises magnetic sheet defining a plurality of magnetic island portions with alternating north and south magnetic poles and a plurality of interstitial portions, each interstitial portion of the plurality of interstitial portions disposed between two or more respective island portions of the plurality of island portions.

Clause 10. The magnetic hook device of clause 5, wherein the body portion comprises a top body portion and a bottom body portion, wherein the top body portion and the bottom body portion define a cavity therebetween, wherein the magnetic-retaining portion is disposed within at least a portion of the cavity.

Clause 11. The magnetic hook device of clause 10, wherein the top body portion is coupled to the bottom body portion.

Clause 12. The magnetic hook device of clause 10, wherein the hook portion is coupled to the top body portion.

Clause 13. The magnetic hook device of clause 10, wherein the hook portion is coupled to the bottom body portion.

Clause 14. The magnetic hook device of clause 5, wherein the body portion defines a protrusion extending substantially parallel to the first surface of the body portion, wherein the protrusion is configured to be engaged for removal of the magnetic hook device from the ferromagnetic object.

Clause 15. A method of forming a magnetic hook device, comprising: forming a body portion comprising a top body portion defining a first surface and a bottom body portion defining a second surface opposite the first surface of the top body portion, wherein the top body portion and the bottom body portion define a cavity therebetween; forming a hook portion coupled to or integrally formed with at least one of the top body portion or the bottom body portion, wherein the hook portion extends outwardly from the first surface of the top body portion; positioning a magnetic-retaining portion within the cavity;

coupling a first surface of a magnetic device to the magnetic-retaining portion, wherein a second surface of the magnetic device opposite the first surface of the magnetic device is disposed substantially parallel to the second surface of the bottom body portion.

Clause 16. The method of clause 15, wherein the method further comprises coupling a grip material to the second surface of the magnetic device and at least a portion of the second surface of the bottom body portion.

Clause 17. The method of clause 16, wherein the grip material defines a grip surface opposite the second surface of the bottom body portion, wherein the second surface of the magnetic device is a distance D from the grip surface, wherein the distance D is within a range from about 0.01 millimeters to about 0.5 millimeters.

Clause 18. The method of clause 15, wherein forming the body portion comprises coupling the top body portion to the bottom body portion.

Clause 19. The method of clause 15, wherein the method further comprises forming the magnetic device, wherein the magnetic device comprises magnetic sheet defining a plurality of magnetic island portions with alternating north and south magnetic poles and a plurality of interstitial portions, each interstitial portion of the plurality of interstitial portions disposed between two or more respective island portions of the plurality of island portions.

Clause 20. The method of clause 15, wherein positioning the magnetic-retaining portion comprises overmolding at least one of the top body portion and the bottom body portion on to at least a portion of the magnetic-retaining portion.

What is claimed is:

1. A magnetic hook device, comprising:

a body portion comprising a top body portion defining a first surface and a bottom body portion defining a second surface opposite the first surface, wherein the top body portion is coupled to the bottom body portion, wherein the top body portion and the bottom body portion define a cavity;

a hook portion extending from the bottom body portion outwardly beyond the first surface of the top body portion;

a magnet-retaining portion disposed within the cavity;

a magnetic device defining a first surface coupled to the magnetic retaining portion and a second surface opposite the first surface, wherein at least a portion of the second surface of the magnetic device extends substantially parallel to the second surface of the body portion;

a grip material disposed on at least a portion of the second surface of the bottom body portion, wherein the magnetic device is configured to magnetically couple the magnetic hook device to a ferromagnetic object, and wherein the grip material is configured to compress in response to a force between the magnetic device and the ferromagnetic object.

2. The magnetic hook device of claim 1, wherein the grip material defines a grip surface opposite the second surface of the bottom body portion, wherein the second surface of the magnetic device is a distance D from the grip surface, wherein the distance D is within a range from about 0.01 millimeters to about 0.5 millimeters.

3. The magnetic hook device of claim 1, wherein the magnetic device comprises a magnetic sheet defining a plurality of magnetic island portions with alternating north and south magnetic poles and a plurality of interstitial portions, each interstitial portion of the plurality of interstitial portions disposed between two or more respective island portions of the plurality of island portions.

4. The magnetic hook device of claim 1, wherein the grip material is disposed on the second surface of the magnetic device.

5. A magnetic hook device, comprising:

a body portion defining a first surface and a second surface opposite the first surface;

a hook portion extending from the first surface of the body portion;

a magnet-retaining portion disposed within at least part of the body portion; and a magnetic device defining a first surface coupled to the magnetic retaining portion and a second surface opposite the first surface, wherein at least a portion of the second surface of the magnetic device extends substantially parallel to and is recessed a distance D from the second surface of the body portion, wherein the magnetic device is configured to magnetically couple the magnetic hook device to a ferromagnetic object, and wherein the second surface of the body portion comprises grip material, and the grip material is configured to compress in response to a force between the magnetic device and the ferromagnetic object.

6. The magnetic hook device of claim 5, wherein distance D is within a range from about 0.01 millimeters to about 0.5 millimeters.

7. The magnetic hook device of claim 5, wherein the grip material covers at least a portion of the body portion extending between the first surface of the body portion and the second surface of the body portion.

8. The magnetic hook device of claim 5, wherein the magnetic device comprises magnetic sheet defining a plurality of magnetic island portions with alternating north and south magnetic poles and a plurality of interstitial portions, each interstitial portion of the plurality of interstitial portions disposed between two or more respective island portions of the plurality of island portions.

9. The magnetic hook device of claim 5, wherein the body portion comprises a top body portion and a bottom body portion, wherein the top body portion and the bottom body portion define a cavity therebetween, wherein the magnetic-retaining portion is disposed within at least a portion of the cavity.

10. The magnetic hook device of claim 9, wherein the top body portion is coupled to the bottom body portion.

11. The magnetic hook device of claim 9, wherein the hook portion is coupled to the top body portion.

12. The magnetic hook device of claim 9, wherein the hook portion is coupled to the bottom body portion.

13. The magnetic hook device of claim 5, wherein the body portion defines a protrusion extending substantially parallel to the first surface of the body portion, wherein the protrusion is configured to be engaged for removal of the magnetic hook device from the ferromagnetic object.

14. A method of forming a magnetic hook device, comprising:

forming a body portion comprising a top body portion defining a first surface and a bottom body portion defining a second surface opposite the first surface of the top body portion, wherein the top body portion and the bottom body portion define a cavity therebetween;

forming a hook portion coupled to or integrally formed with at least one of the top body portion or the bottom body portion, wherein the hook portion extends outwardly from the first surface of the top body portion;

positioning a magnetic-retaining portion within the cavity;

coupling a first surface of a magnetic device to the magnetic-retaining portion, wherein a second surface of the magnetic device opposite the first surface of the magnetic device is disposed substantially parallel to the second surface of the bottom body portion, and forming the magnetic device, wherein the magnetic device comprises a magnetic sheet defining a plurality of magnetic island portions with alternating north and south magnetic poles and a plurality of interstitial portions, each interstitial portion of the plurality of interstitial portions disposed between two or more respective island portions of the plurality of island portions.

15. The method of claim 14, wherein the method further comprises coupling a grip material to the second surface of the magnetic device and at least a portion of the second surface of the bottom body portion.

16. The method of claim 15, wherein the grip material defines a grip surface opposite the second surface of the bottom body portion, wherein the second surface of the magnetic device is a distance D from the grip surface, wherein the distance D is within a range from about 0.01 millimeters to about 0.5 millimeters.

17. The method of claim 14, wherein forming the body portion comprises coupling the top body portion to the bottom body portion.

18. The method of claim 14, wherein positioning the magnetic-retaining portion comprises overmolding at least one of the top body portion and the bottom body portion on to at least a portion of the magnetic-retaining portion.

* * * * *